United States Patent
Raju et al.

(10) Patent No.: US 12,099,147 B2
(45) Date of Patent: Sep. 24, 2024

(54) SURFACE CLEANING SYSTEM TO CLEAN LIDAR SENSOR OF AN AUTONOMOUS VEHICLE

(71) Applicant: GM Global Technology Operations LLC, Detroit, MI (US)

(72) Inventors: Kothamasi Sumithra Raju, Bangalore (IN); Sudipto Ray, Bangalore (IN); Yuchuan Liu, Troy, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 17/742,886

(22) Filed: May 12, 2022

(65) Prior Publication Data

US 2023/0366997 A1 Nov. 16, 2023

(51) Int. Cl.
| | |
|---|---|
| *B05B 1/00* | (2006.01) |
| *B05B 1/08* | (2006.01) |
| *B60S 1/54* | (2006.01) |
| *G01S 7/497* | (2006.01) |

(52) U.S. Cl.
CPC .............. *G01S 7/497* (2013.01); *B05B 1/005* (2013.01); *B05B 1/08* (2013.01); *B60S 1/54* (2013.01); *G01S 2007/4977* (2013.01)

(58) Field of Classification Search
CPC .................................................. G02B 27/0006
See application file for complete search history.

(56) References Cited

U.S. PATENT DOCUMENTS

| | | | |
|---|---|---|---|
| 2,367,426 A * | 1/1945 | Patterson | B60S 1/522 15/250.002 |
| 2003/0155001 A1* | 8/2003 | Hoetzer | B60S 1/0822 134/52 |
| 2005/0045213 A1* | 3/2005 | Blanco | B08B 7/0035 134/25.4 |
| 2010/0200609 A1* | 8/2010 | Cadigan | B60S 5/02 222/144.5 |
| 2013/0092758 A1* | 4/2013 | Tanaka | B60S 1/52 239/284.1 |
| 2015/0177512 A1* | 6/2015 | Hayakawa | G02B 27/0006 348/148 |
| 2015/0183406 A1* | 7/2015 | Tanaka | B05B 7/0815 134/99.1 |
| 2015/0202663 A1* | 7/2015 | Oba | H04N 23/50 15/94 |
| 2015/0353024 A1* | 12/2015 | Cooper | B60R 11/04 348/148 |
| 2017/0036647 A1* | 2/2017 | Zhao | G02B 27/0006 |

(Continued)

FOREIGN PATENT DOCUMENTS

| | | | | |
|---|---|---|---|---|
| DE | 102006024693 A1 * | 11/2007 | ............ | B60S 1/0848 |
| WO | WO-2022209614 A1 * | 10/2022 | ................ | B60S 1/62 |

*Primary Examiner* — Spencer E. Bell
*Assistant Examiner* — Omair Chaudhri
(74) *Attorney, Agent, or Firm* — CANTOR COLBURN LLP

(57) ABSTRACT

A vehicle having a Lidar system includes a cleaning apparatus that performs a method of cleaning the Lidar system. The cleaning apparatus includes a nozzle for spraying a gas onto a window of the Lidar, a pump for controlling a flow of the gas through the nozzle, and a processor. The processor is configured to control the pump to control the flow of the gas through the nozzle at a variable flow rate.

17 Claims, 5 Drawing Sheets

(56) References Cited

U.S. PATENT DOCUMENTS

| | | | | |
|---|---|---|---|---|
| 2017/0368995 | A1* | 12/2017 | Seeley | B60S 1/56 |
| 2018/0194330 | A1* | 7/2018 | Ichikawa | H04N 23/811 |
| 2018/0272996 | A1* | 9/2018 | Nielsen | B60S 1/52 |
| 2019/0202411 | A1* | 7/2019 | Zhao | B60S 1/52 |
| 2019/0210570 | A1* | 7/2019 | Schmidt | B60S 1/56 |
| 2020/0070784 | A1* | 3/2020 | Matsunaga | B60S 1/56 |
| 2020/0159010 | A1* | 5/2020 | Kuwae | G01S 7/4813 |
| 2020/0180567 | A1* | 6/2020 | Sakai | B60S 1/603 |
| 2020/0180569 | A1* | 6/2020 | Seo | B60S 1/54 |
| 2020/0331438 | A1* | 10/2020 | Matsushita | F04B 35/04 |
| 2021/0086727 | A1* | 3/2021 | Bopp | B60S 1/56 |
| 2021/0197221 | A1* | 7/2021 | Rachow | B05B 3/0427 |
| 2021/0197769 | A1* | 7/2021 | Shirakura | B60S 1/56 |
| 2021/0229638 | A1* | 7/2021 | Watano | B60Q 1/0005 |
| 2021/0309187 | A1* | 10/2021 | Rice | B60S 1/56 |
| 2021/0339711 | A1* | 11/2021 | Menicovich | B60S 1/56 |
| 2021/0341584 | A1* | 11/2021 | Ren | G01S 17/931 |
| 2022/0038611 | A1* | 2/2022 | Meister | G02B 27/0006 |
| 2022/0306049 | A1* | 9/2022 | Badanov | B60S 1/52 |
| 2022/0390568 | A1* | 12/2022 | Kubota | G01S 7/4813 |
| 2023/0031726 | A1* | 2/2023 | Kubota | G01S 7/4813 |
| 2023/0182689 | A1* | 6/2023 | Yang | G02B 27/0006 |
| | | | | 239/284.1 |

* cited by examiner

SURFACE CLEANING SYSTEM TO CLEAN LIDAR SENSOR OF AN AUTONOMOUS VEHICLE

INTRODUCTION

The subject disclosure relates to Lidar systems in autonomous vehicles, and, in particular, to a system and method for cleaning a window or surface of the Lidar system.

An autonomous vehicle can use Lidar (Light Detection and Ranging) to locate objects within its environment, thereby allowing the vehicle to navigate safely through the environment. The Lidar can include a housing and a window through which light beams can pass. The window is exposed to the environment. Therefore, rain, dirt and debris can settle on the window, thereby affecting the effectiveness of the Lidar. Accordingly, it is desirable to provide a system and method for quickly and effectively cleaning the window of the Lidar.

SUMMARY

In one exemplary embodiment, a method of cleaning a window of a Lidar system of a vehicle. A gas is controlled using a processor to flow through a nozzle directed at the window to spray from the nozzle at a variable flow rate.

In addition to one or more of the features described herein, the variable flow rate is a pulse of the gas. A peak flow rate of the pulse is 48 liters per minute and a duration of the pulse is 5 milliseconds. A diameter of the nozzle is 1.4 millimeters and a length of the nozzle is 57 millimeters. Wherein the nozzle includes a plurality of nozzles, the method further includes controlling the flow of the gas through each of the plurality of nozzles to generate the variable flow rate in each of the plurality of nozzles. The gas flows over a time interval such that the time interval during which gas flows through a first nozzle is temporally disjoint from the time interval during which gas flows through a second nozzle. The nozzle has an elevation angle from a base of the Lidar system and a tilt angle within a plane parallel to the base.

In another exemplary embodiment, a cleaning apparatus for a Lidar system of a vehicle is disclosed. The cleaning apparatus includes a nozzle for spraying a gas onto a window of the Lidar, a pump for controlling a flow of the gas through the nozzle, and a processor configured to control the pump to control the flow of the gas through the nozzle at a variable flow rate.

In addition to one or more of the features described herein, the variable flow rate is a pulse of the gas. A peak flow rate of the pulse is 48 liters per minute and a duration of the pulse is 5 milliseconds. A diameter of the nozzle is 1.4 millimeters and a length of the nozzle is 57 millimeters. In an embodiment, the nozzle includes a plurality of nozzles, each nozzle having an associated pump and the processor is further configured to control each pump to generate the variable flow rate in each of the plurality of nozzles. Each of the pumps is activated over a time interval and the time interval during which a first pump is activated is temporally disjoint from the time interval during which a second pump is activated. The nozzle has an elevation angle from a base of the Lidar system and a tilt angle within a plane parallel to the base.

In yet another exemplary embodiment a vehicle is disclosed. The vehicle includes a window of a Lidar system, a nozzle for spraying a gas onto the window, a pump for controlling a flow of the gas through the nozzle, and a processor configured to control the pump to control the flow of the gas through the nozzle at a variable flow rate.

In addition to one or more of the features described herein, the variable flow rate is a pulse of the gas. A peak flow rate of the pulse is 48 liters per minute and a duration of the pulse is 5 milliseconds. A diameter of the nozzle is 1.4 millimeters and a length of the nozzle is 57 millimeters. In an embodiment, the nozzle includes a plurality of nozzles, each nozzle having an associated pump and the processor is further configured to control each pump to generate the variable flow rate in each of the plurality of nozzles. Each of the pumps can be activated over a time interval and the time interval during which a first pump is activated is temporally disjoint from the time interval during which a second pump is activated.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
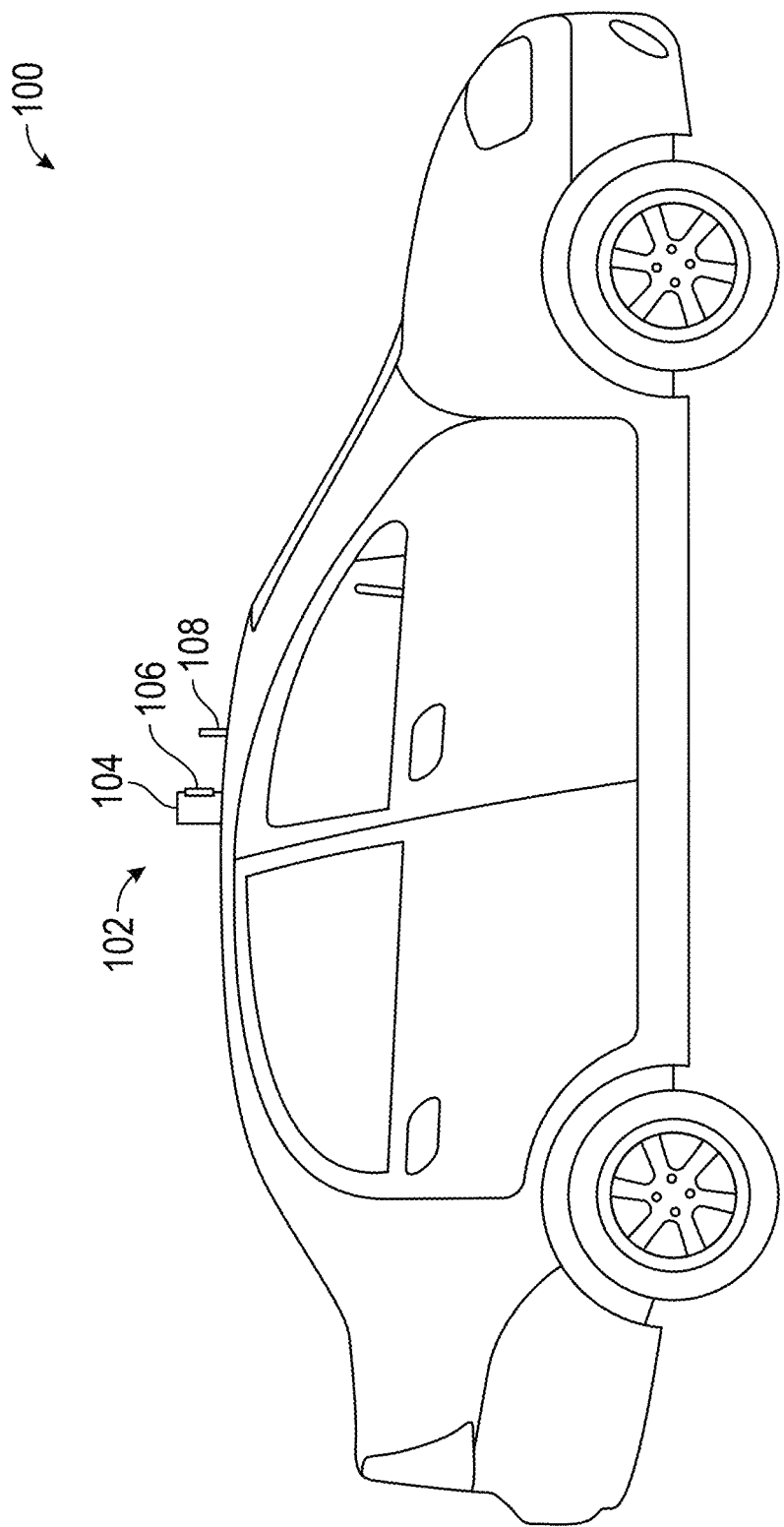
FIG. 1 shows a vehicle having a Lidar system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100 having a Lidar system 102. The Lidar system 102 includes a housing 104 and a window 106. The housing 104 houses various electrical components of the Lidar system to protect them from the environment, such as rain, dirt, dust, etc. The electrical components of the Lidar system 102 can include a light source, such as a laser, and a light-sensitive sensor. The window 106 is transparent or semi-transparent in a region of the electromagnetic spectrum surrounding the wavelength of the laser. A light beam generated at the light source passes through the window 106 to interact with objects in the environment. A reflection of the light beam off of objects in the environment can pass through the window 106 to enter into the housing and be detected at the sensor. The vehicle 100 also includes a cleaning apparatus 108 that cleans debris and fluid, such as rain droplets, from the window 106.

Figure 2:
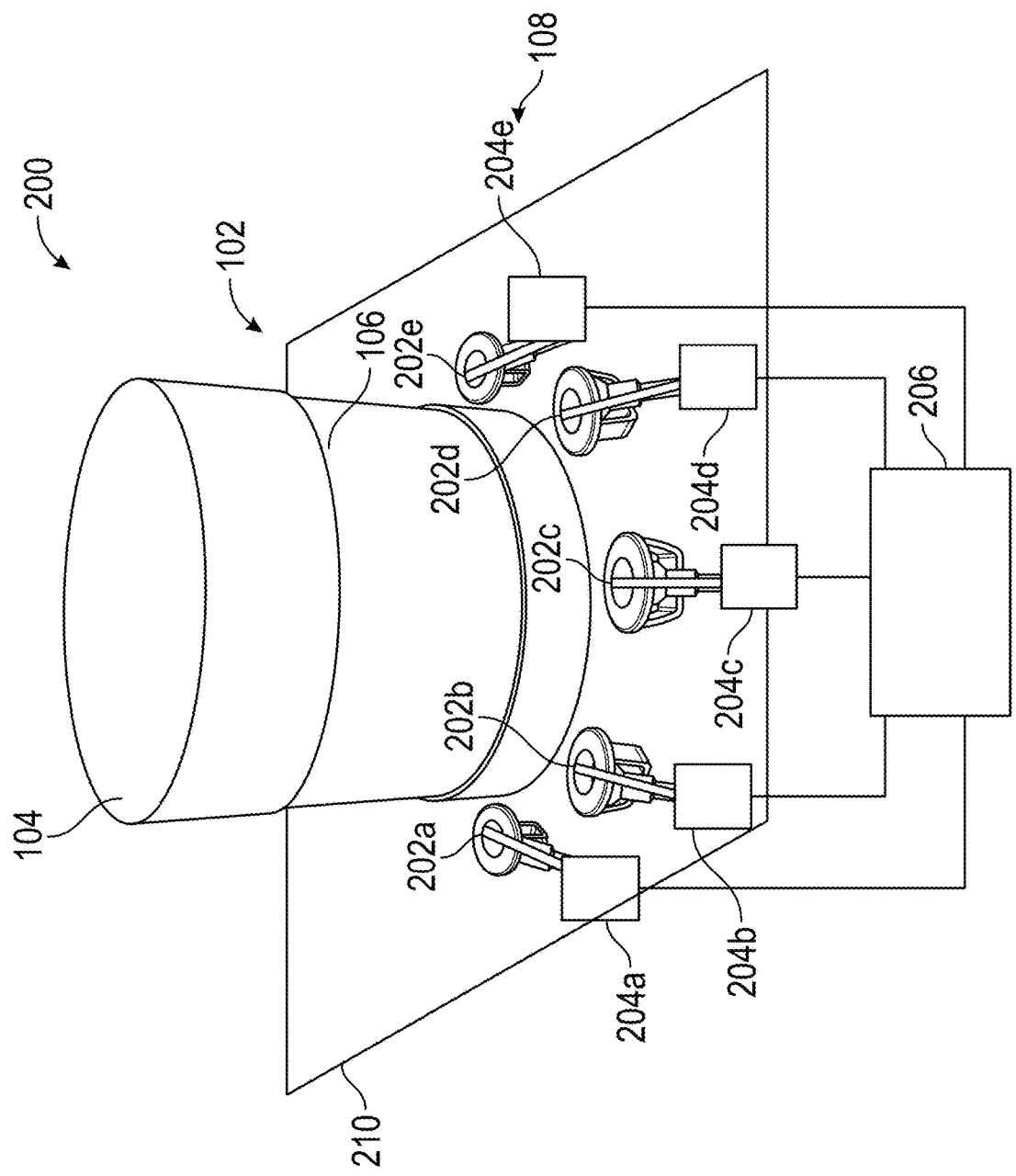
FIG. 2 shows a perspective view of the Lidar system and the cleaning apparatus.

FIG. 2 shows a perspective view 200 of the Lidar system 102 and the cleaning apparatus 108. In various embodiments, the housing 104 extends above a base 210 that is generally a horizontal surface of the vehicle 100. The window 106 has a surface which is a curved or cylindrical surface. The surface of the window 106 can be at a non-zero angle to the base 210 and can be extending vertically or perpendicularly from the base 210.

The cleaning apparatus 108 includes a plurality of nozzles 202a-202e which blow a gas, such as air, onto the window 106 to force fluid and/or debris off of the surface of the window 106. In an illustrative embodiment, the plurality of nozzles 202a-202e includes a first nozzle 202a, second nozzle 202b, third nozzle 202c, fourth nozzle 202d and fifth nozzle 202e. The plurality of nozzles 202a-202e are spaced azimuthally around the window 106 and are located equidistant from the window 106. For illustrative purposes, five nozzles are shown in FIG. 2. This however is not meant as a limitation of the invention and any number of nozzles can be used in different embodiments.

The cleaning apparatus 108 further includes a plurality of pumps 204a-204e. Each of the plurality of nozzles 202a-202e is associated with one of the plurality of pumps 204a-204e. A selected pump (e.g., third pump 204c) controls the flow of the gas through its associated nozzle (e.g., third nozzle 204c) to spray or eject the gas onto the surface of the window 106. A processor 206 is coupled to each of the plurality of pumps 204a-204e and controls the operation of the plurality of pumps 204a-204e to control the flow rate of the gas through the plurality of nozzles 202a-202e. The processor 206 can activate the plurality of nozzles 202a-202e sequentially to spray gas at the window 106 one at a time (i.e., each nozzle being active at independent time intervals).

Figure 3:
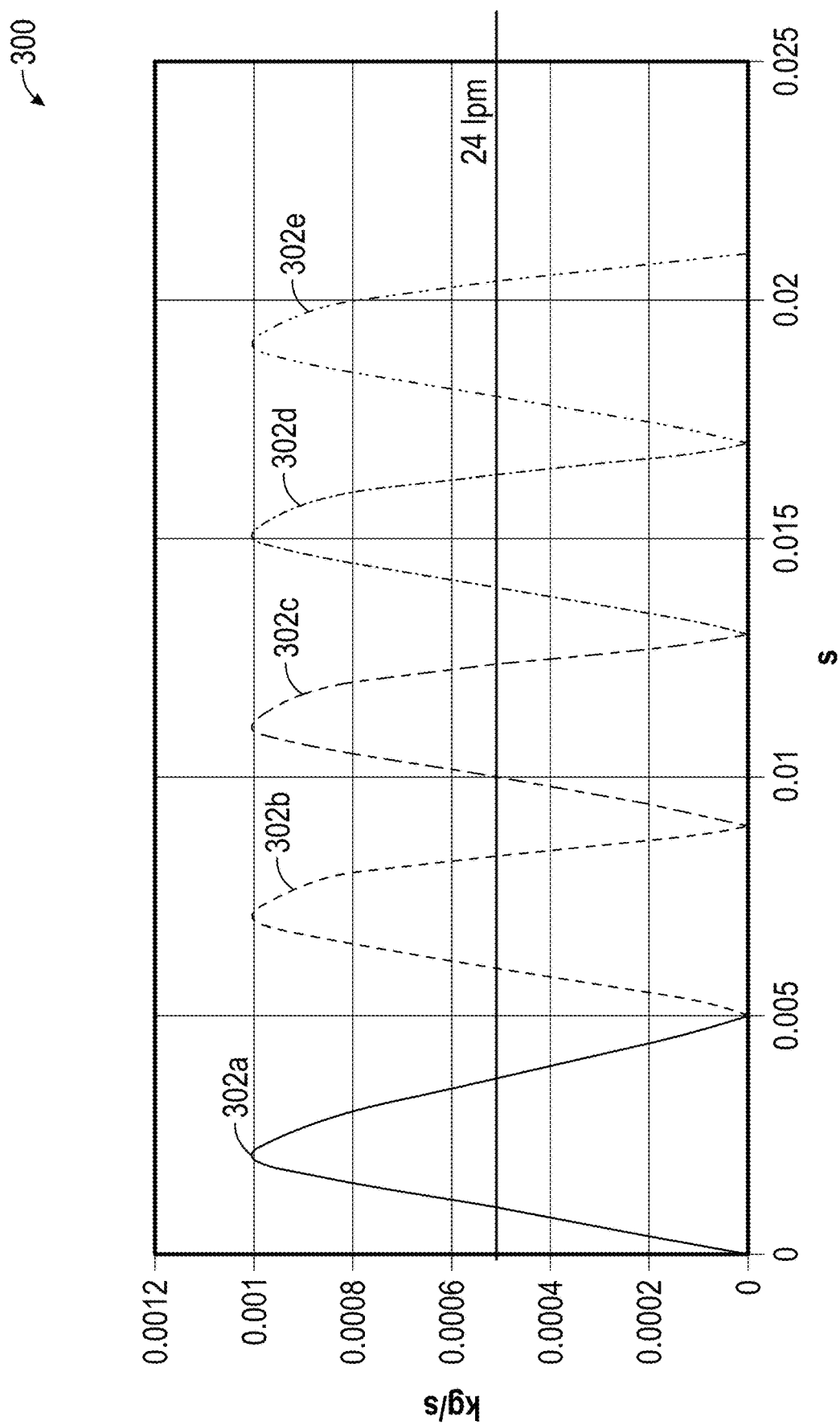
FIG. 3 shows a graph illustrating the flow rate of gas from each of the plurality of nozzles over time, in an illustrative embodiment.

FIG. 3 shows a graph 300 illustrating the flow rate of gas from each of the plurality of nozzles over time, in an illustrative embodiment. Time is shown along the abscissa in seconds and flow rate is shown along the ordinate axis in kilograms/second (kg/s). The flow rate can be a variable flow rate and the gas can be sprayed using a pulse of gas. The graph 300 includes five flow profiles for pulses of gas, each flow profile representing the pulse from a corresponding one of the plurality of nozzles 202a-202e shown in FIG. 2. The first flow profile 302a shows the flow rate of the first nozzle 202a, the second flow profile 302b shows the flow rate at the second nozzle 202b, the third flow profile 302c shows the flow rate at the third nozzle 202c, the fourth flow profile 302d shows the flow rate at the fourth nozzle 202d, and the fifth flow profile 302e shows the flow rate at the fifth nozzle 202e. In general, each nozzle is activated during time intervals that are temporally disjoint. In an embodiment, a given flow profile exhibits a sinusoidal wave that starts at zero flow rate, rises to a peak flow rate, and then declines back to zero flow rate.

In various embodiments, a waveform for a pulse has a profile as described by the polynomial shown in Eq. (1):

$$y = ax^3 + bx^2 + cx \qquad \text{Eq. (1)}$$

where y is the flow rate and x is time. In an embodiment, the coefficients are a=3333, b=−400 and c=1.1677. An amplitude of the waveform is within a range from about 15 liters per minute (lpm) to about 60 lpm. In various embodiments, the peak flow rate is about 48 liters per minute. The duration of the pulse is in a range having a lower bound of about 5 milliseconds (ms) and an upper bound of about 25 ms. The time required for activating all of the nozzles 202a-202e is in a range having a lower bound of about 20 ms and an upper bound of about 500 ms. The peak flow rate for a pulse occurs midway through the pulse. For a pulse having a duration of 5 ms, the peak flow rate occurs at 2.5 ms. The total activation time for the plurality of nozzles can be altered to any selected time interval based on the time required to remove a particular type of debris (e.g., water, mud, dirt). However, one nozzle is expected to have pulse around 5 ms.

Figure 4:
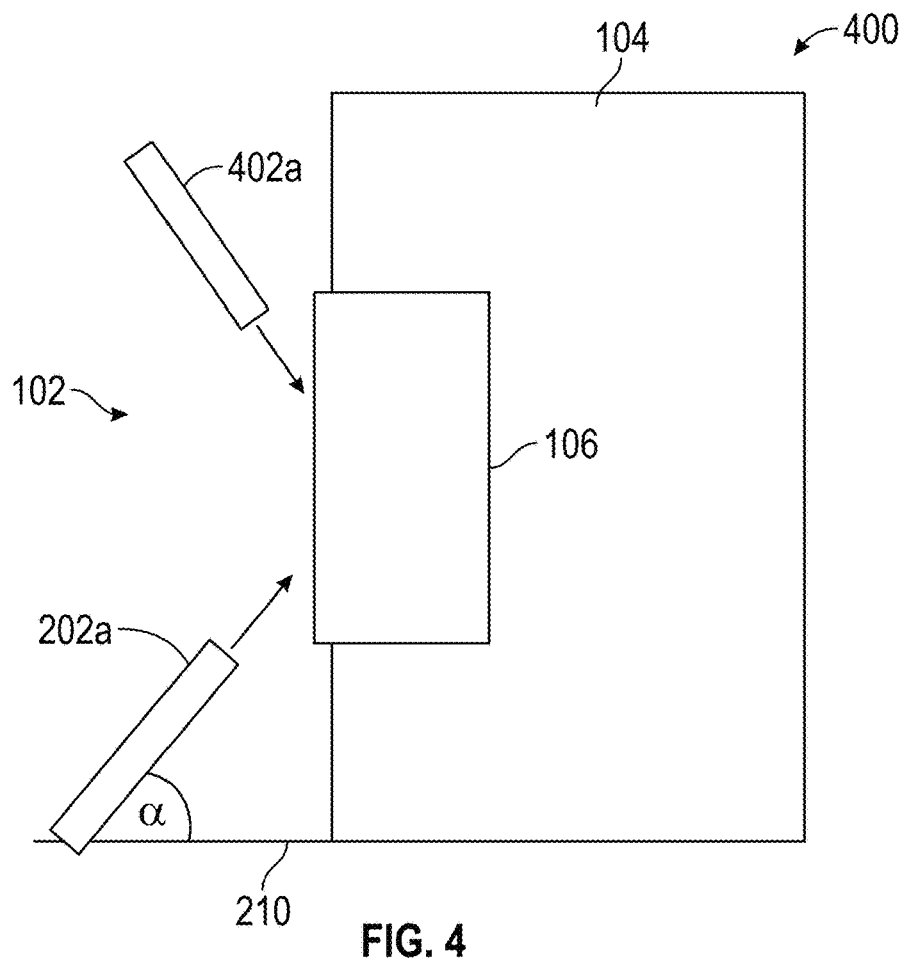
FIG. 4 shows a schematic side view of the Lidar system in an illustrative embodiment.

FIG. 4 shows a schematic side view 400 of the Lidar system 102 in an illustrative embodiment. The side view 400 shows the window 106 and a nozzle (e.g., nozzle 202a). The nozzle is located at the base 210 and has an elevation angle α with respect to the base. The elevation angle α is about 65 degrees. However, the elevation angle α can be at any selected angle within the angular range between about 45 degrees and 65 degrees, in various embodiments. A length of the nozzle is about 57 millimeters (mm) and a diameter of the nozzle is about 1.4 mm.

In an embodiment, a secondary nozzle 402a is located near a top end of the window 106. The secondary nozzle 402a can be used to provide an additional flow of gas onto the window 106 or can be used to spray cleaning fluid onto the window. In various embodiments, each of the plurality of nozzles 202a-202e can have a corresponding nozzle that sprays cleaning fluid (similar to the secondary nozzle 402a). The secondary nozzle 402a can be actuated at the same time as its corresponding nozzle 202a.

Figure 5:
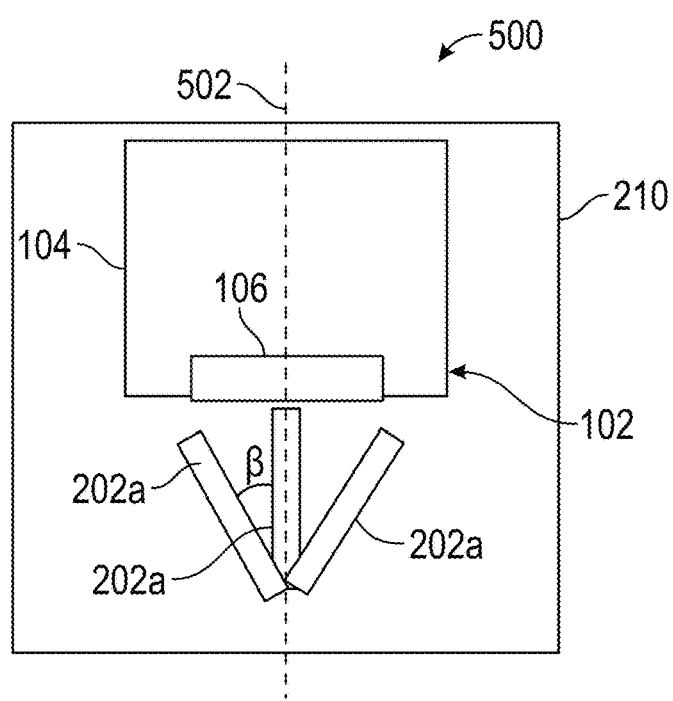
FIG. 5 shows a schematic top view of the Lidar system including a nozzle of the cleaning apparatus.

FIG. 5 shows a schematic top view 500 of the Lidar system 102 including a nozzle of the cleaning apparatus 108. For illustrative purposes, first nozzle 202a is shown. The first nozzle 202a can be arranged in a first configuration in which the nozzle is directed along a line 502 perpendicular to the surface of the window 106. In an alternate embodiment, the first nozzle 202a can have a tilt angle β with respect to line 502, with the base of the nozzle along the line 502 and the outlet of the nozzle away from the line. The tilt angle β is an angle to either side of line 502 and is within a plane parallel to the base 210.

Figure 6:
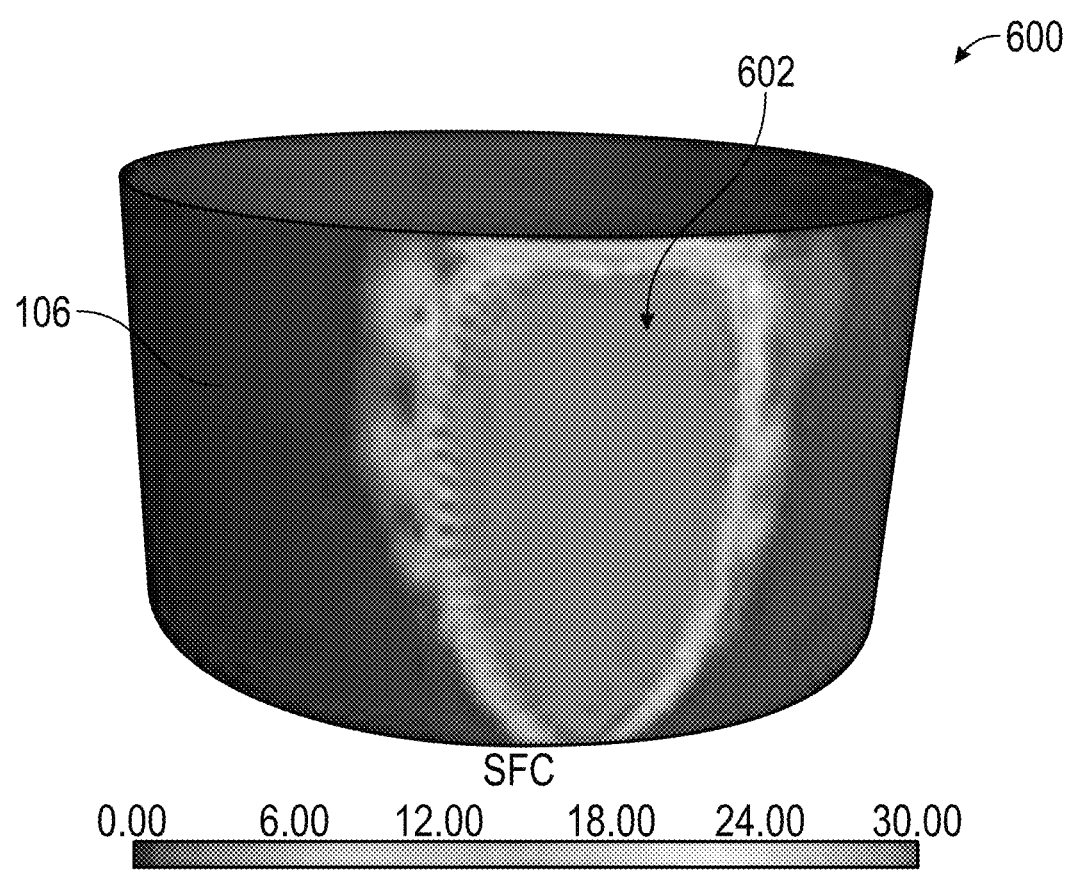
FIG. 6 shows a spray profile illustrating the effects of applying the pulsed spray to the window.

FIG. 6 shows a spray profile 600 illustrating the effects of applying the pulsed spray to the window 106. A spray zone 602 indicates values of a skin friction coefficient produced by the spray. The skin friction coefficient indicates a shear stress on a surface of the window 106 generated by the gas sprayed by the nozzle. The spray zone 602 indicates a high skin friction coefficient over a large region of the window 106.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of cleaning a window of a Lidar system of a vehicle, comprising:
    a pump for controlling a flow of air;
    controlling the pump, using a processor, to flow air through a primary nozzle located at a base of the window and directed at the window to spray from the nozzle at a variable flow rate, wherein the variable flow rate of air has a profile in the form of a cubic polynomial;
    controlling, using the processor, a secondary nozzle located at a top end of the window to spray cleaning fluid onto the window, wherein the processor actuates the secondary nozzle at a same time as the primary nozzle; and the variable flow rate is given by $y=ax^3+bx^2+cx$, where y is the flow rate, x is time, a=3333, b=−400 and c=1.1677.

2. The method of claim 1, wherein a peak flow rate of the pulse is 48 liters per minute and a duration of the pulse is 5 milliseconds.

3. The method of claim 1, wherein a diameter of the nozzle is 1.4 millimeters and a length of the nozzle is 57 millimeters.

4. The method of claim 1, wherein the primary nozzle includes a first nozzle and a second nozzle, further comprising controlling the flow of the gas through the first nozzle at the variable flow rate and controlling the flow of the gas through the second nozzle at the variable flow rate.

5. The method of claim 4, wherein a first time interval during which gas flows through the first nozzle is temporally disjoint from a second time interval during which gas flows through the second nozzle.

6. The method of claim 1, wherein the nozzle has an elevation angle from a base of the Lidar system and a tilt angle within a plane parallel to the base.

7. A cleaning apparatus for a Lidar system of a vehicle, comprising:
a primary nozzle for spraying air onto a window of the Lidar, the primary nozzle located at a base of the window;
a pump for controlling a flow of the air through the primary nozzle;
a secondary nozzle located at a top end of the window for spraying cleaning fluid onto the window;
a processor configured to control the pump to control the flow of the air through the primary nozzle at a variable flow rate, wherein the variable flow rate of air has a profile in the form of a cubic polynomial, and the processor is configured to actuate the secondary nozzle at a same time as the primary nozzle; and
the variable flow rate is given by $y=ax^3+bx^2+cx$, where y is the flow rate, x is time, a=3333, b=−400 and c =1.1677.

8. The cleaning apparatus of claim 7, wherein a peak flow rate of the pulse is 48 liters per minute and a duration of the pulse is 5 milliseconds.

9. The cleaning apparatus of claim 7, wherein a diameter of the nozzle is 1.4 millimeters and a length of the nozzle is 57 millimeters.

10. The cleaning apparatus of claim 7, wherein the primary nozzle includes a first nozzle and a second nozzle and the pump includes a first pump associated with the first nozzle and a second pump associated with the second nozzle, and the processor is further configured to control the first pump to generate the variable flow rate in the first nozzle and control the second pump to generate the variable flow rate in the second nozzle.

11. The cleaning apparatus of claim 10, wherein a first time interval during which the first pump is activated is temporally disjoint from a second time interval during which second pump is activated.

12. The cleaning apparatus of claim 7, wherein the nozzle has an elevation angle from a base of the Lidar system and a tilt angle within a plane parallel to the base.

13. A vehicle, comprising:
a window of a Lidar system;
a primary nozzle for spraying air onto the window, the primary nozzle located at a base of the window;
a pump for controlling a flow of the air through the primary nozzle;
a secondary nozzle located at a top end of the window for spraying cleaning fluid onto the window;
a processor configured to control the pump to control the flow of the air through the primary nozzle at a variable flow rate, wherein the variable flow rate of air has a profile in the form of a cubic polynomial and the processor is configured to actuate the secondary nozzle at a same time as the primary nozzle; and
the variable flow rate is given by $y=ax^3+bx^2+cx$, where y is the flow rate, x is time, a=3333, b=−400 and c=1.1677.

14. The vehicle of claim 13, wherein a peak flow rate of the pulse is 48 liters per minute and a duration of the pulse is 5 milliseconds.

15. The vehicle of claim 13, wherein a diameter of the nozzle is 1.4 millimeters and a length of the nozzle is 57 millimeters.

16. The vehicle of claim 13, wherein the primary nozzle includes a first nozzle and a second nozzle and the pump includes a first pump associated with the first nozzle and a second pump associated with the second nozzle, and the processor is further configured to control the first pump to generate the variable flow rate in the first nozzle and control the second pump to generate the variable flow rate in the second nozzle.

17. The vehicle of claim 16, wherein a first time interval during which the first pump is activated is temporally disjoint from a second time interval during which the second pump is activated.

\* \* \* \* \*